United States Patent [19]
Berners-Lee

[11] Patent Number: 5,999,217
[45] Date of Patent: Dec. 7, 1999

[54] APPARATUS AND METHOD FOR ENCODING DATA

[76] Inventor: Charles Peter Berners-Lee, 26 Jubilee Road, Greenford, Middlesex UB6 7HZ, United Kingdom

[21] Appl. No.: 08/816,108

[22] Filed: Mar. 11, 1997

[30] Foreign Application Priority Data

Jun. 6, 1996 [GB] United Kingdom .................... 9611833

[51] Int. Cl.⁶ .................................... H04N 7/26
[52] U.S. Cl. ........................... 348/390; 348/399; 348/411
[58] Field of Search ................................... 348/390, 384, 348/397, 398, 399, 411, 412, 413, 414; H04N 7/26

[56] References Cited

U.S. PATENT DOCUMENTS

| | | | |
|---|---|---|---|
| 4,969,042 | 11/1990 | Houtman | 348/12 |
| 5,140,417 | 8/1992 | Tanaka et al. | 348/384 |
| 5,333,212 | 7/1994 | Ligtenberg | 348/390 |
| 5,457,495 | 10/1995 | Hartung | 348/414 |
| 5,485,212 | 1/1996 | Frederick | 348/415 |
| 5,696,961 | 12/1997 | Gasztonyi | 348/390 |

FOREIGN PATENT DOCUMENTS

| | | |
|---|---|---|
| 346635 | 12/1989 | European Pat. Off. . |
| 402954 | 12/1990 | European Pat. Off. . |
| 614318 | 9/1994 | European Pat. Off. . |
| 2264605 | 9/1993 | United Kingdom . |
| WO8603922 | 7/1986 | WIPO . |
| WO8704034 | 7/1987 | WIPO . |

OTHER PUBLICATIONS

Item No. 2 on ISR Signal Processing. Image Communication, vol. 7, No. 4/06, Nov. 1, 1995, pp. 529–552, XP000538027 Irani M. et al.: "Video Compression Using Mosaic Representations" see p. 530, left–hand column, line 10–27; see p. 539, Section 4.2: "The storage codec."
Item No. 6 on ISR Signal Processing of HDTV, L'Aquila, Feb. 29—Mar. 2, 1988, No. Workshop 2, Feb. 29, 1988, Chiariglione L., pp. 199–205, XP000075054 Brofferio S. et al.: "Computation Bounded Video Coding." See the whole document.

*Primary Examiner*—Howard Britton
*Attorney, Agent, or Firm*—Christie, Parker & Hale, LLP

[57] ABSTRACT

A method of encoding data, involves the steps of comparing an input image from a video camera with an image being built up, and stored in store. The images are processed by an analyser in accordance with a plurality of different algorithms stored in a store to produce a plurality of different data packets each representative of a partial change which can be effected to the image to be built up to bring it closer to the input image. The analyser compares the effects of the different data packets if implemented on the data image to be built up and provides each one with a score in accordance with a predetermined criteria. A comparator selects the packet with the best score under the predetermined criteria and uses it to alter the image in the store accordingly. The cycle is repeated to cause the image to be built up, to progressively converge on the input image.

17 Claims, 4 Drawing Sheets

APPARATUS AND METHOD FOR ENCODING DATA

FIELD OF THE INVENTION

The present invention relates to a method and apparatus for encoding data.

BACKGROUND OF THE INVENTION

Transmission of data, such as television signal data representative of an image scanned, usually requires a substantial amount of data to be transmitted before a sufficiently useful reproduction of the image can be produced from a receiver receiving the data. Various systems have been proposed in which data derived from scanning an image is compressed before transmission, expanded upon reception and reproduced. The viewer at the receiver still has to wait for much of the received data to be received and reproduced before he can view a useful image.

It is an object of the invention to provide an improved encoding method and apparatus.

SUMMARY OF THE INVENTION

According to the present invention there is provided data encoding apparatus comprising a first store for storing data representative of an input image and a second store for storing data representative of an output image, an analyser for comparing the data in the two stores and conducting a plurality of different operations on the data, to produce a plurality of packets of data each representative of a different change to be applied to the output image, and to allocate a score to each packet indicative of the extent to which the packet, will if applied to the output image, improve the output image, means for selecting the packet with the score representing the packet providing the most significant improvement, and means for causing the selected packet to effect the change it represents to the data stored in the second store, whereby upon successive cycles to cause the data in the second store to progressively converge on the data stored in the first store.

According to the present invention there is further provided a method of encoding data, comprising the steps of comparing an input image with an image being built up, processing the differences between the images in accordance with one or more different algorithms to produce a plurality of different data packets each representative of a partial change which can be effected to the image to be built up to bring it closer to the input image, comparing the effects of the different data packets if implemented on the data image to be built up and providing each one with a score indicative of the significance of said partial change, selecting the packet with the best score and using it to alter the image to be built up accordingly, and repeating the cycle to cause the image to be built up, to progressively converge on the input image.

According to the present invention there is still further provided a method of compressing data representative of an image, comprising the steps of scanning an image in accordance with a selected one of a plurality of predetermined scanning regimes, comparing the data produced as a result of the scan with data representing an image stored in a data store, weighting the difference sensed, and in accordance with a predetermined criteria, selecting one of said plurality of scanning regimes as determined by the weighting and producing difference data representative of at least some of the differences between the scanned image as scanned under the selected scanning regime and the image stored in the data store; combining the difference data with data from the data store to produce data representative of a virtual image, comparing the virtual image data with the data in the store and weighting the difference scanned in accordance with said predetermined algorithm to cause a scanning regime selected in accordance with the algorithm to scan the image, producing difference data representative of at least some of the differences between the scanned image as scanned by the selected scanning regime and the image stored in the data store, combining the difference data with data stored in the data store to produce a new virtual image, repeating the steps of producing a new virtual image until a predetermined criteria determined at least in part by a comparison of the weightings is reached, and transmitting the difference data used to produce a selected one of said virtual images to an output terminal and to said data store to update the data in the data store.

Other objects and many of the attendant features of the invention will be more readily appreciated as the same becomes better understood by reference to the following detailed descriptions and considered in connection with the accompanying diagrammatic drawings.

DESCRIPTION OF THE PREFERRED EMBODIMENTS

The method and apparatus to be described, aims at producing and transmitting a succession of encoded data packets from an image being scanned, which when received, will be decoded to allow the build up of a reproduced image progressively, so that the most significant features of the image can be displayed first, and lesser significant features added subsequently until a fully detailed image becomes apparent.

Thus, for example, where the image comprises a football pitch, the first packets of information transmitted may be the coordinates of a rectangle to allow the perimeter of the football pitch to be reproduced from the receiver very speedily. This will be followed by packets giving the coordinates of the goal posts representing smaller perhaps slewed rectangles to be added to the picture, followed by packets providing outline profiles of the players on the pitch and then packets providing alphanumeric data displayed on the players shirts and perhaps ending with packets establishing the facial characteristics of the different players.

Using such a mode of transmission, the viewer of the reproduced image receives useful information very much earlier than he would otherwise have done so, allowing the viewer to comprehend and even act on the information received sometimes well before a fully detailed image becomes apparent.

The method and apparatus uses a first store to hold data representative of an image being scanned (an input image) and a second or holding store to hold data representative of an interim image (an output image). An analyser analyses the input and output images (for example pixel by pixel), using one or more algorithms to produce a number of different data packets, one algorithm may produce more than one packet. Each data packet can be used to add data to the data held in the holding store to bring it into closer conformity with the data held in the first store. The analyser allocates a score to each packet of data indicative of the significance of the improvement it can make to the data held in the holding store. The packet of data with the highest score is then transmitted to the receiver or to a buffer store for subsequent transmission, and at the same time is used to update the data in the holding store. Once the holding store is updated, the analyser will make a new comparison and the cycle is repeated. The data in the holding store will, thus, always be representative of the image which has been progressively built up from the data received by the receiver.

Figure 1:
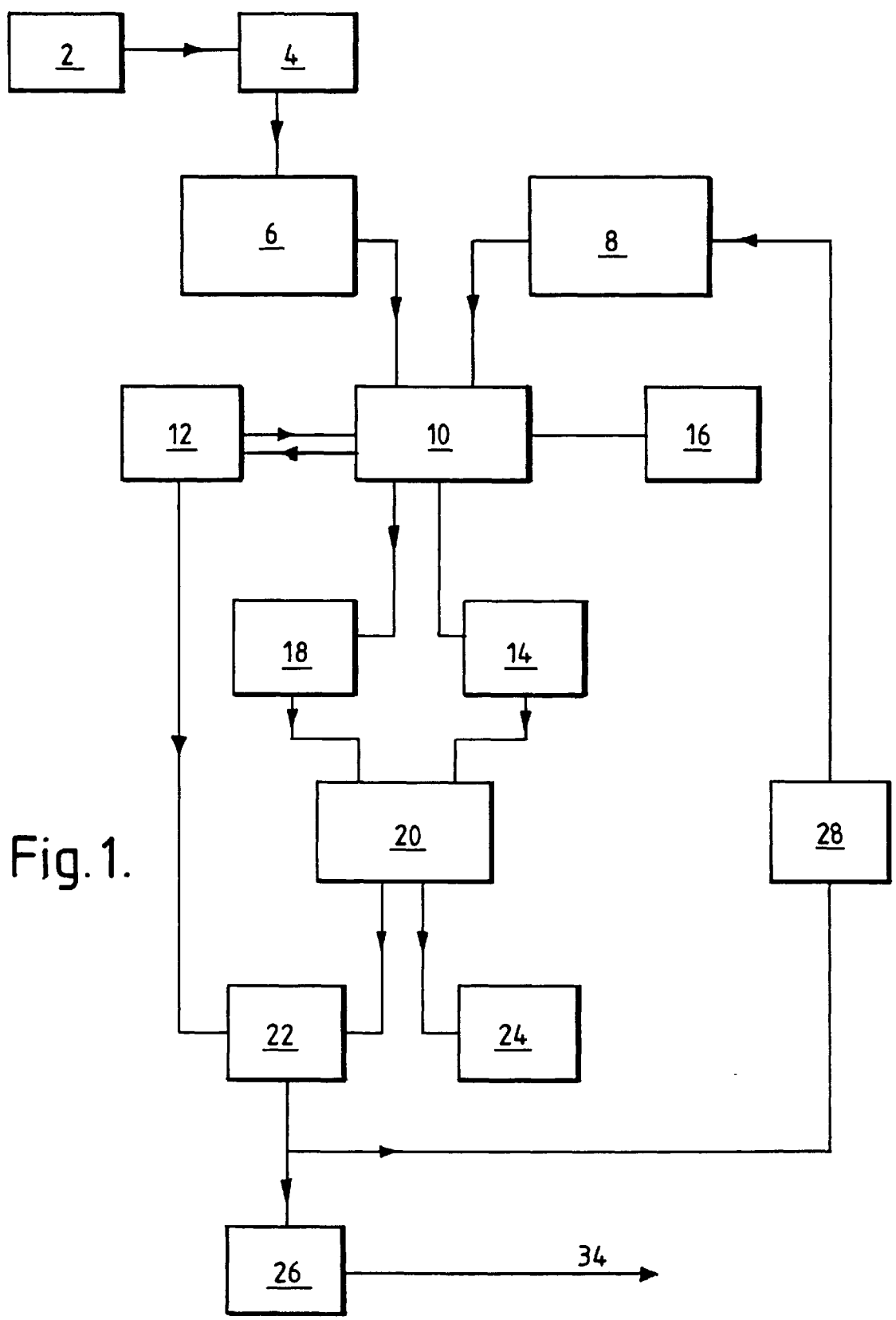
FIG. 1 is a block diagram of the data encoding apparatus.

FIG. 1 shows a system for carrying out the method described above.

A video camera 2 views a moving or stationary image to be transmitted and the video signal produced is fed to an analogue to digital converter 4 which converts the signal into digital form. The digital image signal is then stored in a first or frame store 6. A second or holding store 8 holds the digital information of an interim or output image. Initially, the interim image is merely the image of a blank screen but progressively, as will be described hereinafter, the image will be built up to converge on the image stored in the frame store.

An analyser 10 compares the images stored in the two stores 6 and 8. The analyser 10 operates under the control of a control unit 12 to perform a series of analyses on the data in the two stores 6 and 8.

The analyser 10 is programmed to evaluate the potential contribution to the output image produced by each a succession of algorithms stored in an algorithm store 16. For example, one algorithm might suggest that the whole picture should be reduced in brightness by 10%. Another algorithm might suggest that the lower half of the picture should be black. Each algorithm might suggest more than one operation. Each operation is represented as a packet of data containing sufficient data for a decoder to carry out the operation. In some cases where the packet described geometric shapes such as a rectangle, the packet can be very compact. In other cases where a more complex change is required such as when using fractal information, the packets are larger.

Each packet is given a score in accordance with the degree of significance that its effect would have on the image in the store 8 were the packet to be used to update the image stored in the store 8. The score may be given for example in accordance with the size of the reduction in the total number of pixel differences detected that the packet would produce, but other scoring schemes could be used. For particular requirements, for example for highlighting selected features, the scores may be weighted.

Each packet produced by the analyser 10 is stored in succession in a current packet store 18 and its score or weighted score is stored in a current packet score store 14. A best packet store 22 is provided to store the best packet to date and its corresponding weighting or score is stored in a best packet score store 24. A comparator 20 compares the score stored in store 14 with the score stored in store 24. If the score stored in the store 14 is higher than that of the score stored in the store 24 then the comparator 20 acts to replace the packet in store 22 with the packet in store 18 and replace the score in store 24 with the score in store 14. After a predetermined time set by the control unit 12, the packet in the best packet store 22 is transmitted to a packet decoder 28 for decoding and onward transmission to the holding store 8 to update the image therein. Simultaneously, the packet may be stored in a buffer store 26 to await transmission to a remote receiver (not shown). Instead the packet may be transmitted to the remote receiver directly via an output line 34.

The control unit 12 can also control the period of each cycle in which a packet is produced in accordance with system requirements.

The feedback from the analyser 10 can be used by control unit 12 to command the analyser to operate in a number of specific ways.

The control unit 12 may request that the analyser concentrate on a specific part of the picture.

The control unit may request that the analyser concentrate on a still frame from a moving picture, that is, a snap shot.

The control unit may request that a lower bit rate be transmitted, giving the analyser more time for analysis, or conversely, the control unit may request a higher bit rate, giving the analyser less time for analysis.

The control unit may apply a handshaking protocol to the analyser, signalling when the transmission chain is ready for more data.

The control unit may request the analyser to format packets requiring less computationally intense methods of decoding. In some circumstances, the control unit 12 may respond to feedback data received from the site of the receiving unit (not shown).

While the analyser 10 has been described as processing the difference data using each algorithm in sequence, it will be appreciated that the processing can take place in parallel and a selector (not shown) needed to select the packet with the highest score for onward transmission instead of using the stores 18 and 22 and the comparator 20 to achieve this end.

It will be appreciated that the described system will cope with colour images as well as moving images.

Figure 2:
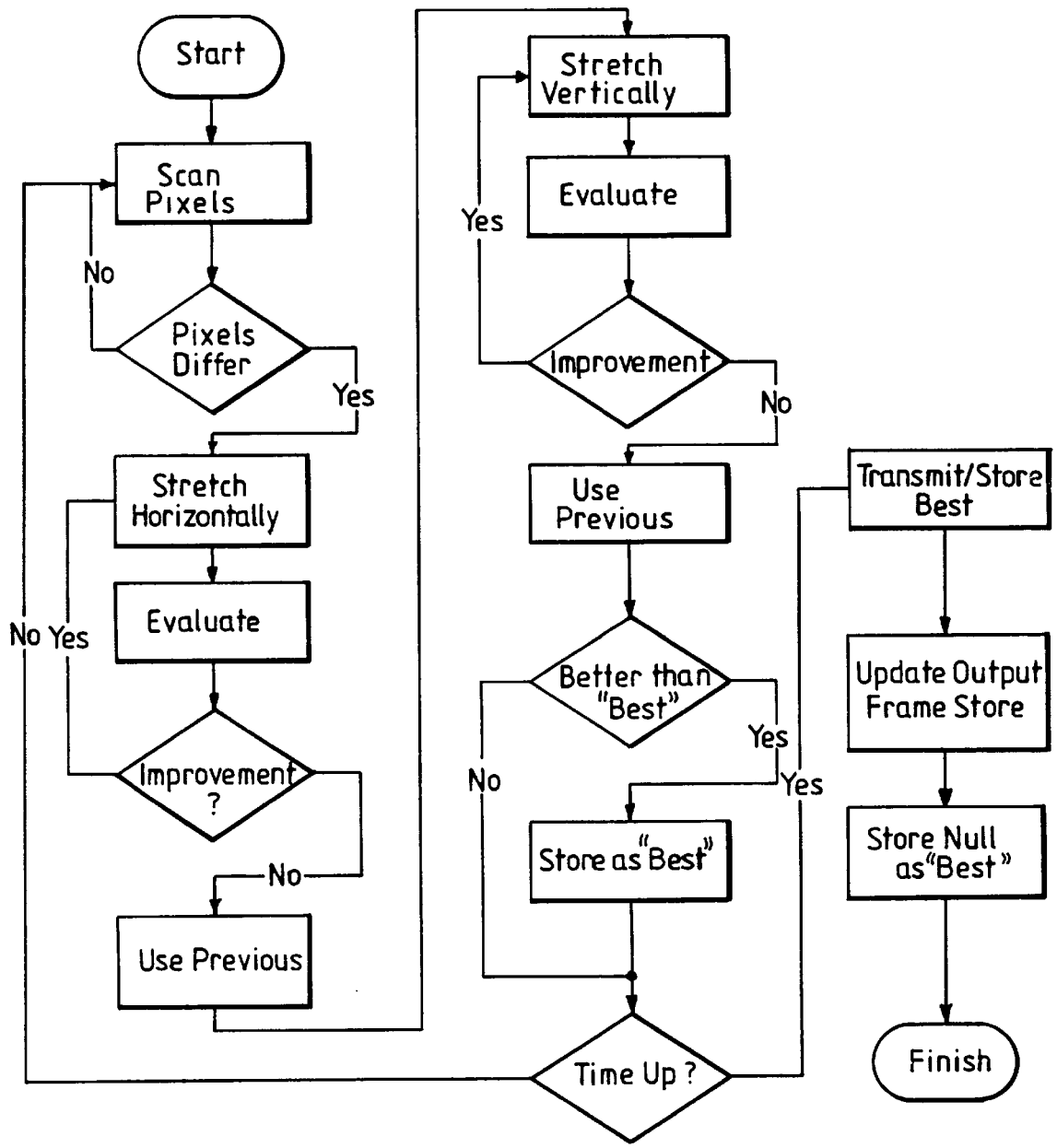
FIG. 2 is a flow chart illustrating the operation of the apparatus of FIG. 1.

An example of algorithms which may be used by the analyser 10 will now be described in conjunction with the flow chart of FIG. 2. The analyser will basically look for shapes in the form of rectangles and once the coordinates of a suitable rectangle have been established, the resultant packet can be transmitted to update the holding store 8.

The analyser 10 scans the input frame store 6 in search of a pixel which differs from the corresponding pixel in the holding frame store 8. This scan may be a simple left to right top to bottom scan though other scan methods could be used. Once a differing pixel has been found, the analyser 10 considers it as a rectangle. It then stretches this rectangle horizontally to include more pixels. The stretch may be by a single pixel, or use a more sophisticated stretching method. The analyser 10 then evaluates the rectangle to determine the benefit of drawing on the image in the holding store this rectangle in a colour equal to the average colour of the pixels in the corresponding rectangle in the frame store. This may be done by giving the rectangle a score. If the rectangle thus formed would represent a greater improvement to the image in the holding store 8, then a similar rectangle, stretched still further horizontally is evaluated. The stretch operation is repeated until there is no further improvement. The previous, and best so far rectangle is then used. The rectangle is then similarly stretched vertically and evaluated, the stretch operation being repeated until no further improvement is made. If this rectangle is better than the previous best since the last packet was stored or transmitted, then it is stored as the best. A test may be done at this and/or other points to check whether there is time for further computation for this next packet. If not, the best packet is passed on for transmission or storage. The image in the store 8 is then updated and the best packet store is given a null value, as it is at initiation.

Hence, the rectangle is stretched horizontally until there is no further improvement. It is then stretched vertically until there is no further improvement. If this rectangle scores more than the previous best scoring rectangle, then it is stored as the best so far. Scanning continues. The method for choosing the starting position may be, but is not limited to, choosing the pixel after the top right hand corner of the last rectangle evaluated. A time constraint may be applied to the analyser such that after a given period of time, the analyser takes the highest scoring rectangle so far, and transmits or stores this for decoding by a receiver. It also draws this rectangle onto the image store in the holding store 8.

Rectangles may be evaluated and compared by means of a score. For the rectangle of FIG. 3, the score S can be evaluated as:

$$S = R_{score} + G_{score} + B_{score}$$

where $R_{score}$, $G_{score}$ and $B_{score}$ are given by:

$$R_{score} = \sum_{j=y_1}^{j=y_2} \sum_{i=x_1}^{i=x_2} (|R_{in}[i,j] - R_{out}[i,j]| - |R_{in}[i,j] - R_{ave}[i,j]|)$$

$$G_{score} = \sum_{j=y_1}^{j=y_2} \sum_{i=x_1}^{i=x_2} (|G_{in}[i,j] - G_{out}[i,j]| - |G_{in}[i,j] - G_{ave}[i,j]|)$$

$$B_{score} = \sum_{j=y_1}^{j=y_2} \sum_{i=x_1}^{i=x_2} (|B_{in}[i,j] - B_{out}[i,j]| - |B_{in}[i,j] - B_{ave}[i,j]|)$$

Here the absolute magnitude of an expression A is denoted by: $|A|$.

$R_{in}[i,j]$, $G_{in}[i,j]$ and $B_{in}[i,j]$ represents the colour component values of a pixel in the input picture frame at coordinates (i,j). Similarly, $R_{out}[i,j]$, $G_{out}[i,j]$ and $B_{out}[i,j]$ represents the colour component values of a pixel in the output picture frame at coordinates (i,j).

The average RGB (red, green, blue) components of the rectangle on the input frame, $R_{ave}$, $B_{ave}$ and $G_{ave}$ are given by:

$$R_{ave} = \frac{1}{N} \sum_{j=y_1}^{j=y_2} \sum_{i=x_i}^{i=x_2} R_{in}[i,j]$$

$$G_{ave} = \frac{1}{N} \sum_{j=y_1}^{j=y_2} \sum_{i=x_i}^{i=x_2} G_{in}[i,j]$$

$$B_{ave} = \frac{1}{N} \sum_{j=y_1}^{j=y_2} \sum_{i=x_i}^{i=x_2} B_{in}[i,j]$$

Where N is the number of pixels in the rectangle:

$$N = (x_2 - x_1 + 1)(y_2 - y_1 + 1)$$

The above formulae are given for illustrative purposes only. Other formulae would work equally. In particular, in many applications palettes and look up tables may be used to speed computation.

It will be appreciated that a number of different methods for encoding the input picture may be used concurrently. These methods could for instance, include DCT, wavelet or fractal encoding. The results of each method may be scored using the formulae above, other appropriate formulae, applied over the affected area of the input and output frames. The score S for each method may be weighted to provide a weighted score $S_W$. This may be done for example by dividing by the number of bits P required to encode the picture change into a packet:

$$S_W = \frac{S}{P}$$

The packet with the best weighted score $S_W$ is then chosen for transmission or storage. The corresponding changes to the output picture are then made, be they DCT, wavelet, fractal, or whatever. In this example, the score has been weighted to take into account packet size. It could equally have been weighted to take into account the computing power required by the decoder:

$$S_W = \frac{S}{T}$$

where T is an estimate of the time required by the target decoder to decode the packet. Other weighting formulae may be applicable in other instances.

Figures 3, 4:
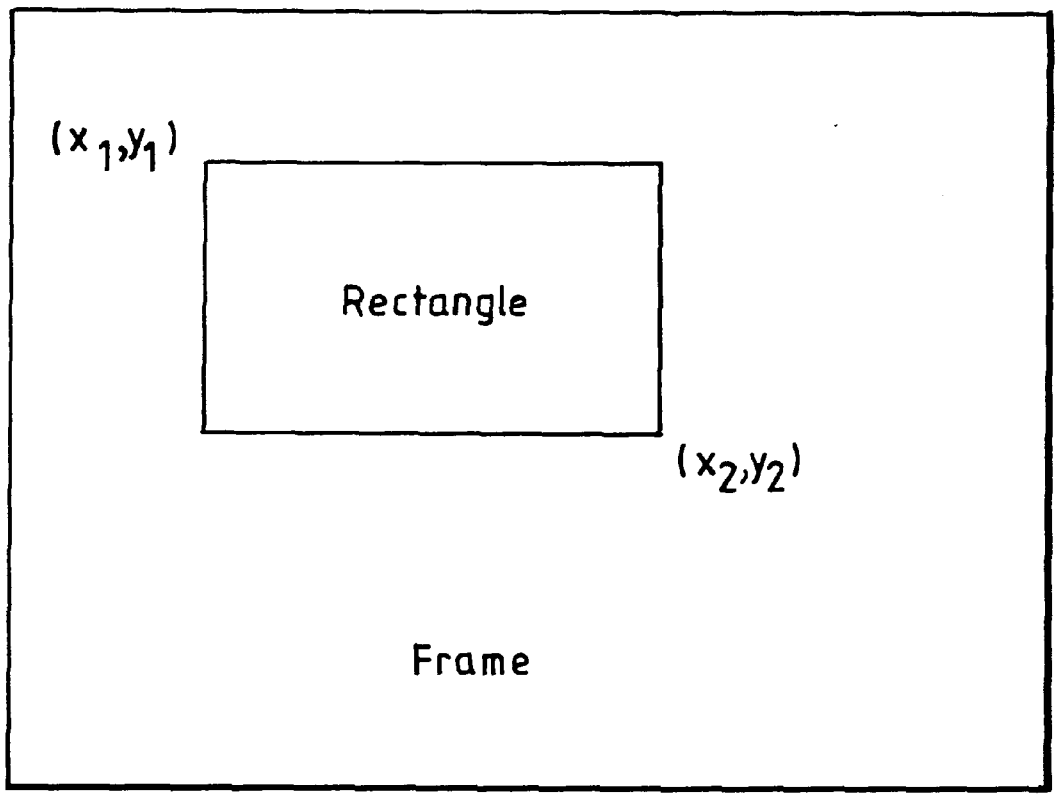
FIG. 3 is an illustration of the operation of the apparatus in an image.
FIG. 4 is a packet of data produced by the apparatus.

The rectangle may, by way of example, be encoded in the form of the packet of FIG. 4, where h is a header field and r, g and b are the red, green and blue colour components.

As mentioned above, more sophisticated means such as, artificial intelligence may be used to recognize objects in the input picture which are more complex than simple rectangles. Further, the packets used may described the motion of elements in the picture or video effects such as pans, fades and wipes. In each instance, the packet shown should provide the maximum weighted score, weighted according to time and other constraints as required.

The evaluation process may be controlled to alter its behaviour. For instance, the scanning may be restricted to a sub-set of the picture. The encoder may also be instructed to concentrate on a still frame only.

It will be appreciated that the encoding apparatus naturally works for both still and moving images allowing one technology to be used in both instances. A hardware implementation of the encoding apparatus could be developed which would quickly encode both still and moving images.

Because the output image converges on the input images, it will eventually exactly match the input image if time and bandwidth allow. It is highly desirable in uses such as archiving that this be the case. It also allows for an image to be encoded losslessly, or with low loss, but for only high-value packets to be transmitted where full picture quality is not necessary.

Because the encoder can make good use of bandwidth, it is particularly applicable to low data rates uses, as it may directly seek to make the best use of available bandwidth. Where high bandwidth is available, this can be used to encode images with less loss.

The use of the control may allow the encoder to transmit information at a variable data rate. This is especially useful where there is no guarantee of bandwidth, such as over the Internet.

Though embodiments of the invention will generally use frame stores, the invention does not rely on motion video as occurring in a series of frames. It encodes video in a series of packets at a rate which need not be related to the incoming frame rate. Hence, the apparatus may be made to work with any frame rate, and even varying frame rates.

However, the encoding apparatus may place regular frame markers in with picture data, and chose to encode the input picture relative to a blank output picture. This may help applications such as non-linear editing or backward playback.

Resolution and aspect ratio independence are allowed. Indeed, resolution and aspect ratio could vary during a piece of video, if required.

The simplicity of the apparatus makes it particularly suitable for use with interactive technologies such as interactive computer programs. The rectangle based method can easily be implemented in conjunction with animation software.

The apparatus can be readily adapted to accommodate future requirements. The converging television and computer industries use technologies which are developing rapidly. Standards can become out of date before they can be taken up. The apparatus and method, however, allow new devices and methods to be incorporated into it as they are invented and made available. The apparatus could be first implemented with the simple rectangle based method. Later it could have fractal wavelet or DCT methods implemented within it. Still later, sophisticated methods incorporating artificial intelligence could be used to give the apparatus the option of describing the image in terms of complex shapes or transformations, should it calculate this to be the most effective method. It should be noted that a comparison of algorithms may not be necessary for every packet but only from time to time. It will, of course, be appreciated that it is not necessary to compare algorithms while one algorithm is producing a succession of high scores. Alternative algorithms are selected when the current algorithm produces a succession of poor results. The use of a system programmed for artificial intelligence will enable the analyser to make an informed guess as to which algorithm to choose.

Resolution, frame rate and aspect ratio independence, together with the ability to incorporate advances in codec technology all allow the apparatus to be used with future generations of image capture and viewing apparatus.

Encoded packets may be encrypted. However, encryption carries with it a computational overhead. The apparatus, however allows some packets to be encrypted and not others, such that a degraded but still recognizable picture is visible without decryption. Thus in pay-per-view and subscription systems a see-before you buy facility is possible.

Because the apparatus uses packets of picture information, it is easy to add data, timecode and audio information and to synchronize these.

Playback may be simple or complex depending on the methods used. For the simple rectangle method, the decoder is very simple and easily implemented in software and supported by graphics hardware, making playback cheap. Encoding may be computational intensive, but with continuing considerable increases in processing power, parallel processing and the possibility of implementing the encoder in hardware, these problems should not be overestimated.

The encoder could use different algorithms for different instances as appropriate for the difference between the input and output pictures and perhaps, in accordance with the capabilities of the receiving equipment.

The output signal could include codes to show how important each piece of encoded data is. Receiving equipment not capable of showing the full picture may then choose not to decode less important parts. As stated hereinbefore, some parts of the data stream could be encrypted so that, for instance, higher resolution information requires decryption and perhaps, payment of a fee.

A simple way of encoding would be to have a computer compare the input and received images pixel by pixel and choose which picture operation results in the lowest sum of the modulus of the difference in colour components taken over the whole picture. A picture operation could be as simple as drawing a coloured rectangle, but could be an instruction such as "reduce the overall brightness by a certain amount" or DCT or wavelet information.

A modified system uses an historical store so that some algorithms can make analysis in terms of historical data and produce data packets accordingly. For example, a packet of data may contain the instructions to overwrite a particular area of the current output picture with pixels from the historical store.

Figure 5:
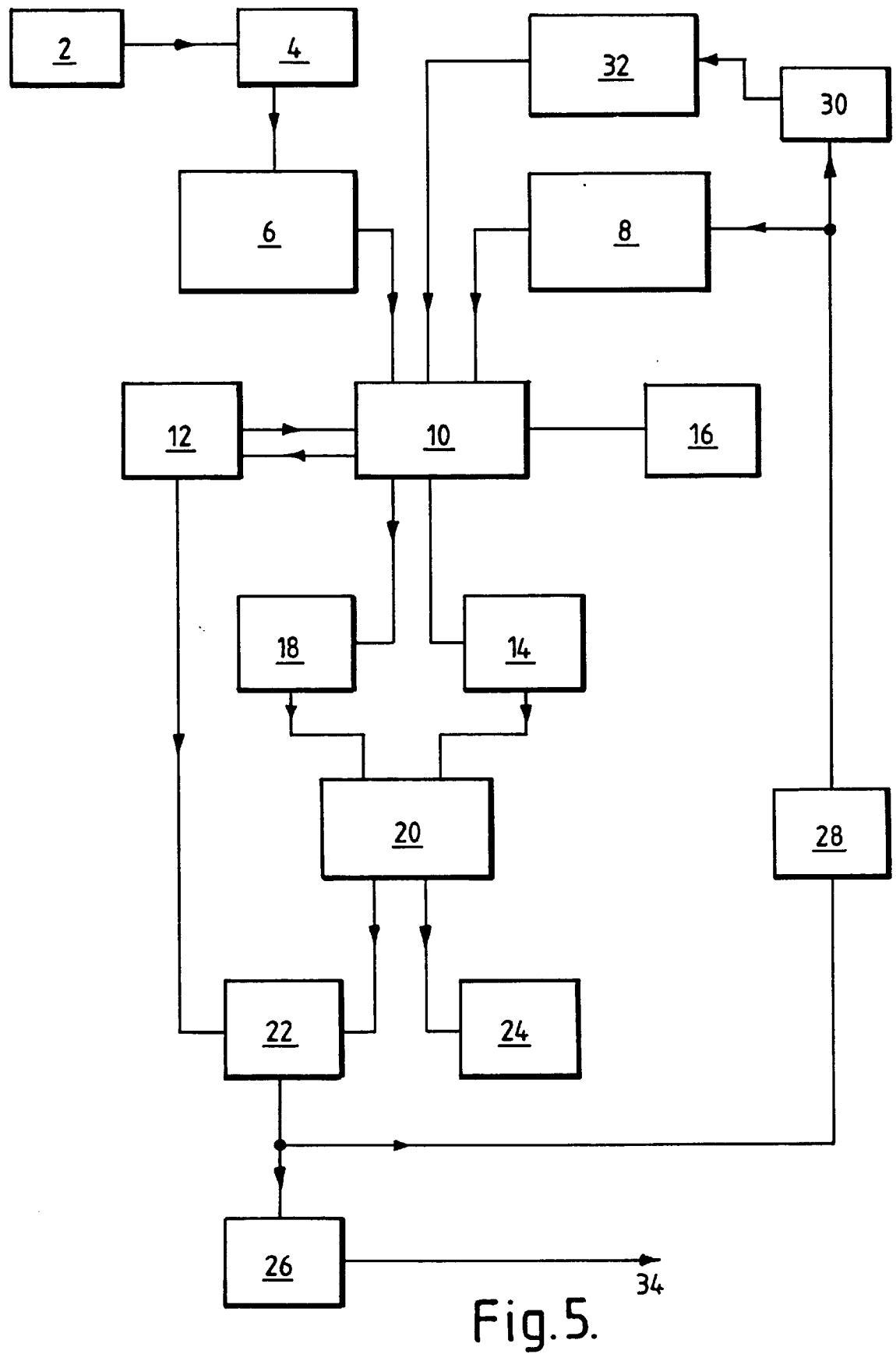
FIG. 5 is a block diagram of a modified data encoding apparatus.

FIG. 5 shows the modified system which is particularly beneficial in situations where the camera 2 views a static or substantially unchanging background with a small object moving across in the foreground.

For example the camera may be used for surveillance purposes, to monitor a car park where individuals are occasionally seen to walk through.

In FIG. 5 parts similar to those in FIG. 1 are similarly referenced. In FIG. 5 a delay circuit 30 is provided between the packet decoder 28 and an auxiliary holding store 32. The analyser 10 is coupled to the auxiliary holding store 32.

In operation the delay circuit 30 delays the supply of packets of data to the auxiliary store 32 (the delay may for example be 30 packets behind that being supplied to the frame store 8). The analyser 10 periodically monitors the data in the auxiliary store 32 and compares it with the data in the input store 6. If this provides a better comparison than that between the stores 6 and 8 in accordance with a predetermined criteria, the analyser 10 will provide a fresh packet of data with an associated score which is then transmitted onwards, as before to use the contents of store 32 to update store 8.

In this way background detail which is temporarily obscured by an object in the foreground can be rapidly reintroduced.

It should further be apparent to those skilled in the art that various changes in form and details of the invention as shown and described may be made. It is intended that such changes be included within the spirit and scope of the claims appended hereto.

I claim:

1. Data encoding apparatus comprising a first store for storing data representative of an input image, a second store for storing data representative of an output image, an analyser for comparing the data in the first and second stores, and conducting a plurality of different operations on the data, to produce a plurality of packets of data each representative of a different change to be applied to the output image, and to allocate a score to each packet indicative of the extent to which the packet will, if applied to the output image, improve the output image, means for selecting the packet with the score representing the packet providing the most significant improvement, and means for causing the selected packet to effect the change it represents to the data stored in the second store, whereby upon successive cycles to cause the data in the second store to progressively converge on the data stored in the first store.

2. Apparatus according to claim 1, including an auxiliary second store for receiving said packets of data, and a delay circuit for delaying the supply of said packets to the auxiliary store, the analyser being coupled to compare the data in the auxiliary second store with the data in the first store and if this comparison produces a better score than the comparison between the first and second stores triggering the auxiliary second store to alter the contents of the second store in accordance with the contents or selected portions of the contents of the auxiliary store.

3. Apparatus according to claim 1, wherein the analyser makes a pixel by pixel comparison of the images stored in the first and second stores.

4. Apparatus according to claim 1, including an algorithm store for storing a plurality of different algorithms whereby to enable the analyser to process the data defining the input and output images with the different algorithms.

5. Apparatus according to claim 4, wherein the analyser is instructed to process the data in the two stores with the different algorithms serially.

6. Apparatus according to claim 5, including a current packet store for storing each packet produced by the analyser in turn, a best packet store, and a comparator for comparing the score of the data packet in the current packet store with the score of the data in the best packet store and transferring the packet in the current packet store to the best packet store when the score of the packet in the current packet store is better than the score of the packet in the best packet store.

7. Apparatus according to claim 4, wherein the analyser is instructed to process the data in the two stores with the different algorithms substantially simultaneously.

8. Apparatus according to claim 4, wherein the analyser is instructed to process the data in the two stores with different algorithms, some of the processes taking place simultaneously and others taking place serially.

9. Apparatus according to any preceding claim, including a selector for comparing the scores of the different packets produced in the different stores and selecting the packet with the best score for onward transmission to the second store.

10. A method of encoding data, comprising the steps of comparing an input image with an image being built up, processing the differences between the input image and the instantaneous built up image in accordance with one or more different algorithms to produce a plurality of different data packets each representative of a partial change which can be effected to the image to be built up to bring it closer to the input image, comparing the effects of the different data packets if implemented on the data image to be built up and providing each one with a score indicative of significance of the said partial change, selecting the packet with the best score and using it to alter the image to be built up accordingly, and repeating the cycle to cause the image to be built up, to progressively converge on the input image.

11. A method according to claim 10, wherein the comparing step compares the two images pixel by pixel.

12. A method according to claim 10, wherein the processing step processes the different data packets substantially simultaneously.

13. A method according to claim 10, wherein the processing step processes the different data packets serially.

14. A method according to claim 10, wherein the processing step processes some of the different data packets serially and others simultaneously.

15. A method according to claim 10, wherein each data packet comprises the coordinates of a geometric shape.

16. A method according to claim 15, wherein the geometric shape is a rectangle.

17. A method of compressing data representative of an image, comprising the steps of scanning an image in accordance with a selected one of a plurality of predetermined scanning regimes, comparing the data produced as a result of the scan with data representing an image stored in a data store, weighting the difference sensed, and in accordance with a predetermined criteria, selecting one of said plurality of scanning regimes as determined by the weighting and producing difference data representative of at least some of the differences between the scanned image as scanned under the selected scanning regime and the image stored in the data store;

combining the difference data with data from the data store to produce data representative of a virtual image, comparing the virtual image data with the data in the store and weighting the difference scanned in accordance with said predetermined algorithm to cause a scanning regime selected in accordance with the algorithm to scan the image, producing difference data representative of at least some of the differences between the scanned image as scanned by the selected scanning regime and the image stored in the data store, combining the difference data with data stored in the data store to produce a new virtual image, repeating the steps of producing a new virtual image until a predetermined criteria determined at least in part by a comparison of the weightings is reached, and transmitting the difference data used to produce a selected one of said virtual images to an output terminal and to said data store to update the data in the data store.

* * * * *